United States Patent [19]

da Silva

[11] 4,373,536
[45] Feb. 15, 1983

[54] MOBILE CORN HARVESTER

[75] Inventor: Jose T. da Silva, Ribeirao Preto, Brazil

[73] Assignee: Cia Penha de Maquinas Agricolas-Copemag, Brazil

[21] Appl. No.: 269,421

[22] Filed: Jun. 1, 1981

[51] Int. Cl.³ ............................................ A01F 12/18
[52] U.S. Cl. ................................. 130/9 R; 130/27 T; 130/27 HF
[58] Field of Search .................. 130/6, 7, 8, 9 R, 9 A, 130/9 B, 9 C, 9 D, 9 E, 9 F, 27 R, 27 T, 30 R, 30 B, 30 E, 30 F, 30 K, 27 H, 27 HA

[56] References Cited

U.S. PATENT DOCUMENTS

| | | | |
|---|---|---|---|
| 1,374,518 | 4/1921 | Oda | 130/27 AF |
| 3,373,871 | 3/1968 | Huether | 130/27 R |
| 3,534,742 | 10/1970 | Knapp et al. | 130/27 T |
| 4,159,023 | 6/1979 | Todd et al. | 130/27 T |

Primary Examiner—Robert A. Hafer
Attorney, Agent, or Firm—Robert E. Burns; Emmanuel J. Lobato; Bruce L. Adams

[57] ABSTRACT

A mobile corn harvester comprises a chassis on which is mounted an upwardly and rearwardly inclined casing. The forward end of the casing is formed as a hopper into which fall corn stalks cut by cutters at the front of the casing. A rotor rotatable in the casing has a forward portion formed as a helical screw which separates ears from the stalks and transports the ears rearwardly to a thrashing section. The stalks pass down through an opening in the bottom of the casing and are crushed by lobed rollers. The thrashing section comprises a cylindrical screen and a rear portion of the rotor having thrashing loops and pins thereon. The grain kernels pass through the screen into a trough where they are transported to the rear of the casing and then up to a bagging platform. A radial fan at the rear end of the rotor draws off waste material and discharges it onto the field.

6 Claims, 5 Drawing Figures

MOBILE CORN HARVESTER

FIELD OF INVENTION

The present invention relates to a mobile harvester for reaping, thrashing and bagging maize, herein referred to as "corn".

BACKGROUND OF THE INVENTION

In earlier years corn was harvested by manually removing the ears from the standing stalks in the field and tossing them into a wagon or truck. It was then necessary to husk the ears and to remove the kernels of corn from the cob by means of a corn sheller.

More recently various corn harvesters have been developed for mechanically removing ears of corn from the stalks and thereupon separating the kernels from the husks and cobs by a thrashing operation. Harvesters of this kind have resulted in a considerable saving of manual labor.

SUMMARY OF THE INVENTION

The present invention is directed to providing a mobile corn harvester which is small, versatile and highly functional. In accordance with the invention the corn harvester comprises a chassis on which is mounted an elongate casing which is inclined upwardly and rearwardly. At the forward end of the casing there is a reaping assembly which cuts the corn stalks at a selected height. The corn stalks with the ears thereon are received in a separating and transport assembly comprising a forward portion of the casing and a forward portion of a rotor which extends substantially the full length of the casing and has on its forward portion a helical vane by means of which the ears, separated from the stalks, are transported rearwardly to a thrashing assembly. The stalks pass down through an elongate opening at the bottom of the casing and are crushed by intermeshing ridged rollers. The thrashing assembly comprises a cylindrical screen in a rearward portion of the casing and thrashing loops and pins on a rearward portion of the rotor which act on the ears of corn to separate the kernels from the husks and cobs. The separated kernels of corn fall through the screen into a trough at the bottom of the casing where they are transported by a screw conveyor to the rear of the casing and then upwardly by an elevator to a discharge spout. A radial fan at the rear end of the rotor draws the waste material rearwardly and discharges it onto the field.

At the rear of the chassis there is preferably provided a bagging platform where grain received alternately from dual discharge spouts is bagged and temporarily stored for unloading from time-to-time from the harvester. The harvester is preferably propelled by a tractor having a power take-off by which operational portions of the harvester are driven.

BRIEF DESCRIPTION OF DRAWINGS

The nature, objects and advantages of the invention will be more fully understood from the following description of the preferred embodiment shown by way of example in the accompanying drawings in which.

DESCRIPTION OF PREFERRED EMBODIMENT

Figure 1:
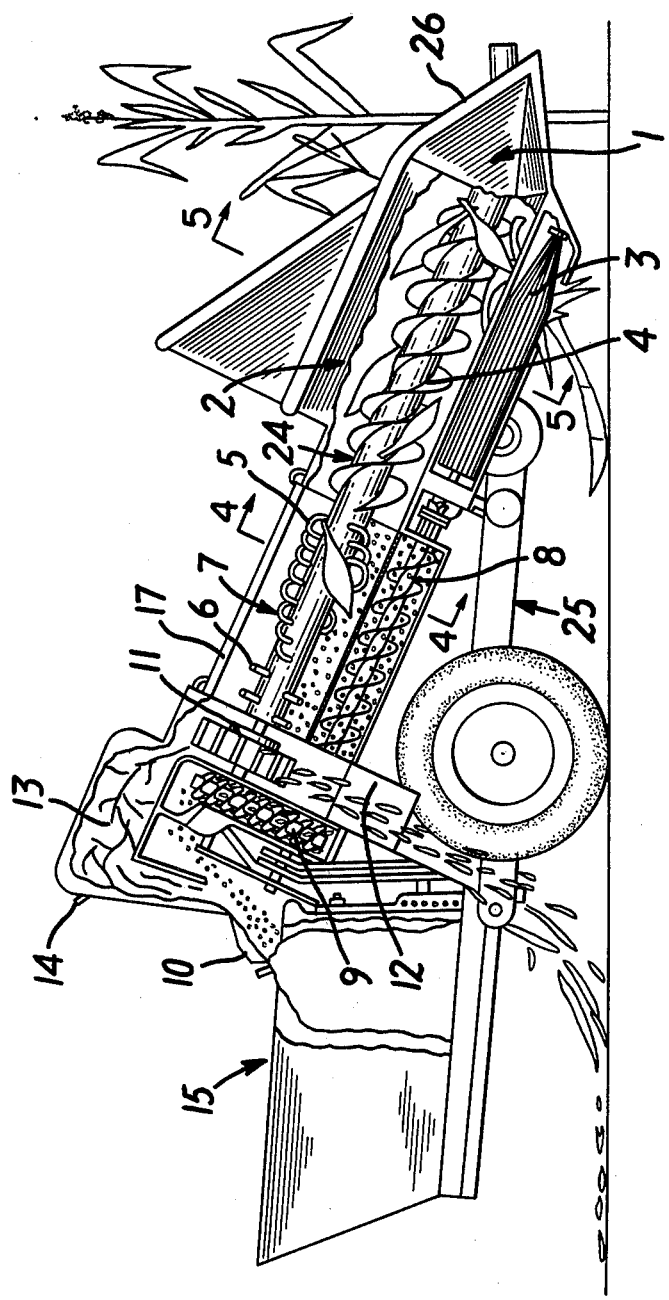
FIG. 1 is a schematic side elevation of a mobile corn harvester in accordance with the invention with parts broken away to show internal construction.

A mobile corn harvester in accordance with the invention shown by way of example in the drawings comprises a reaping assembly 1, a separating and transporting assembly 2, a thrashing assembly 7 and a bagging section 15.

The harvester comprises a chassis 25 on which is mounted a casing 17 that is inclined upwardly and rearwardly. A rotor 24 extends substantially the full length of the casing 17 and is driven by a pulley 22 at its rear end.

The reaping assembly 1 comprises an adjustable receiving mouth at the forward end of the casing 17 with cutter blades along the bottom edges of two side boards 26 which cut and direct the corn stalks with ears thereon to the separating and transport assembly 2. The height of the reaping assembly is adjustable so as to cut the corn stalks at a selected height.

Figure 5:
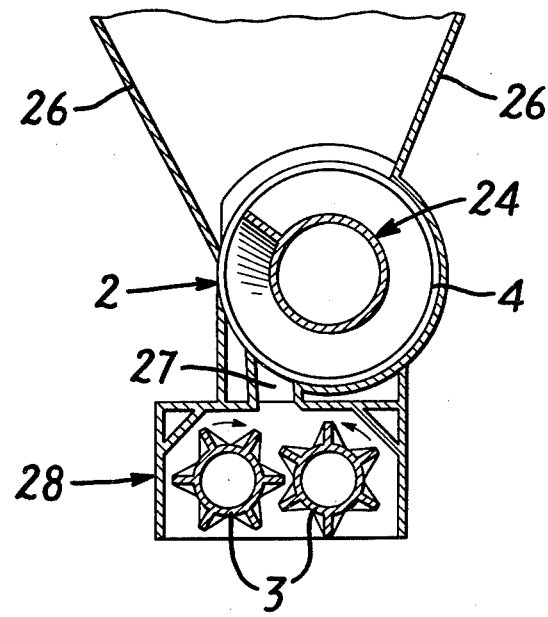
FIG. 5 is a section taken approximately on the line 5—5 in FIG. 1.

The separating and transport assembly 2 comprises a forward portion of the casing 17 which is hopper shaped to receive the corn stalks with ears from the reaping assembly 1. A forward portion of the rotor 24 in the separating and transport assembly section comprises a cylindrical shaft having thereon a helical vane 4. The corn stalks are forced through an elongate opening 27 at the bottom of the casing (FIG. 5) into a crushing assembly 28 comprising two ridged rollers 3 which rotate in opposite directions as shown by the arrows and are provided with intermeshing ridges which crush and break-up the stalks before discharging them onto the field. The ears, and some of the leaves, separated from the stalks, are transported rearwardly by the helical screw 4 to the thrashing assembly 7.

Figure 3:
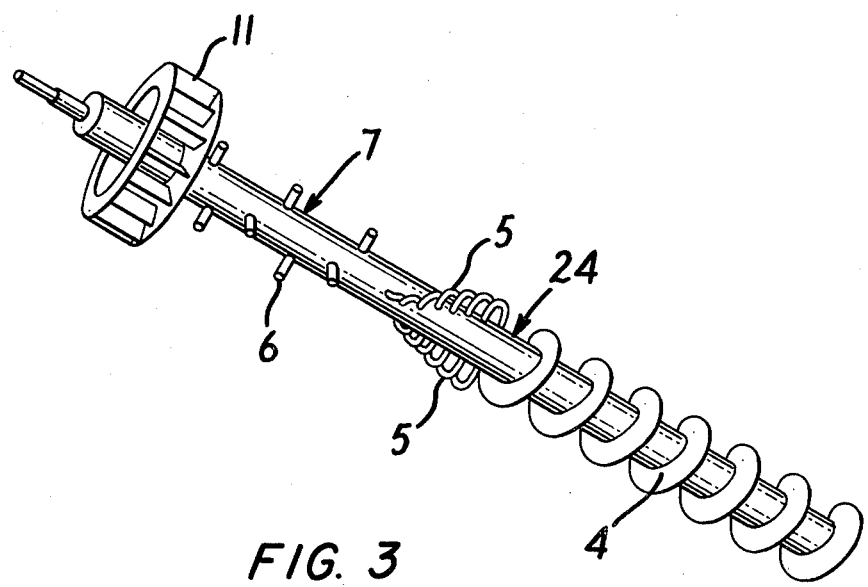
FIG. 3 is a schematic perspective view of the rotor and radial fan.
Figure 4:
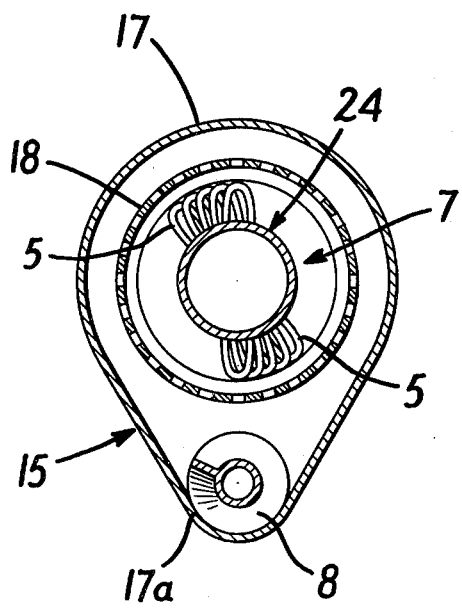
FIG. 4 is a section taken approximately on the line 4—4 in FIG. 1.

The thrashing assembly 7 comprises a perforated cylindrical screen 18 in a rear portion of the casing 17. The cylindrical screen 18 is coaxial with the rotor 24 and may be rotated at a low speed. In the thrashing section 7 the rotor 24 comprises a cylindrical shaft on which are provided a multiplicity of thrashing loops 5 and thrashing pins 6. As seen in FIGS. 1 and 3, the thrashing loops 5 are located forwardly of the thrashing pins 6 and are arranged in rows extending helically of the shaft. Moreover, the height of the thrashing loops 5 decreases rearwardly of the rotor. The thrashing pins 6 are provided on a portion of the rotor rearwardly of the thrashing loops 5 and project outwardly from the cylindrical shaft.

In the thrashing section a lower portion 17a of the casing 17 is formed as a trough which receives the grain kernels passing through the perforated screen 18. A screw conveyor 8 which is rotatable in the trough 17a and is driven by a pulley 21 at its rear end transports the grain upwardly and rearwardly to the rear of the casing 17. A radial fan 11 at the rear end of the rotor 24 draws waste material comprising husks and broken cobs to the rear of the casing 17 and discharges such material through an opening 12 onto the field. While the radial fan 11 is shown as being integral with the rotor 24, it may, if desired, be rotatable coaxial with the rotor and driven at a higher speed.

At the rear end of the screw conveyor 8 there is another screw conveyor 9 which elevates the grain to a discharge spout 10. A passage 13 from the discharge spout 10 to the radial fan 11 provides for an air flow to draw off any light waste material from the grain. A small door in the passage 13 is controlled by a lever 14 so as to regulate the amount of suction exerted by the fan.

The bagging section 15 comprises a platform 16 which is situated immediately behind the thrashing assembly and comprises an area of approximately 4 square meters. Bags are filled from the discharge spout 10 which is of dual construction with two bagging spouts provided with suitable valving devices so that the grain transported by the screw conveyor 9 can be discharged selectively through one or another of the bagging spouts. While a bag is being filled from one spout, a filled bag can be removed and an empty bag provided for the other spout. The platform 16 is of sufficient area that a number of bags can be stored on the platform. Unloading can be done periodically at suitable points thereby avoiding leaving filled bags scattered at random on the field.

The embodiment of the invention illustrated in the drawings is not self propelled but rather is designed to be coupled with a tractor provided with a power take off for driving the several operative parts of the harvester. This provides for more economical operation since the cost is greatly reduced and the tractor can be used for other purposes.

Figure 2:
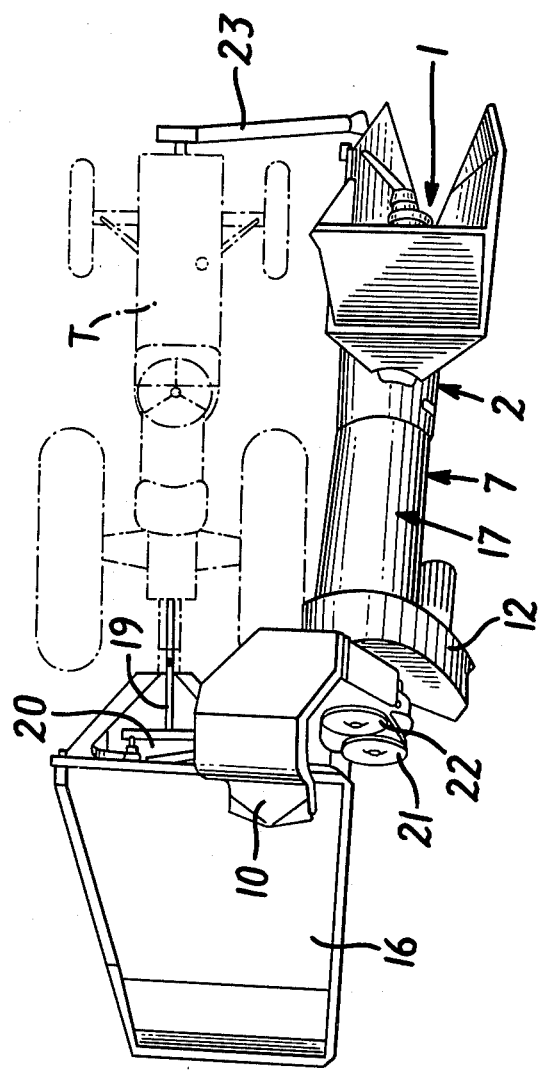
FIG. 2 is a schematic plan view showing in broken lines a tractor for propelling and operating the harvester.

As illustrated schematically in FIG. 2, a shaft 19 connects up with the power take off of a tractor T and is provided at its rear end with a pulley 20. A belt (not shown) connects the pulley 20 with pulleys 21 and 22. Pulley 21 drives the screw conveyor 8 and the ridged rollers 3 while pulley 22 drives the rotor 24 of the thrashing assembly and the separating and transport assembly. The cutting blades of the reaping assembly can be driven from the rotor 24. A cross bar 23 provided at the front of the tractor is connected to a corner of the reaping assembly and serves to stabilize and direct the apparatus.

Thus all operative components of the harvester are driven from the power take off of the tractor so that no prime mover is required on the harvester.

While a preferred embodiment of the invention has been illustrated by way of example in the drawings and is herein particularly described, it will be recognized that many modifications and variations may be made and that the invention is hence in no way limited to the illustrated embodiment.

What I claim is:

1. A mobile corn harvester comprising a chassis, a casing mounted on said chassis and sloping upwardly toward the rear, a rotor extending longitudinally of said casing and rotatable therein, reaping means at the forward end of said casing for cutting corn stalks with ears thereon and delivering them into said casing, a forward portion of said rotor comprising a cylindrical shaft with a helical vane thereon for separating the ears from the stalks and transporting the ears rearwardly to a thrashing means, said casing having an elongate lower opening through which said stalks are discharged, said thrashing means comprising a cylindrical screen in a rearward portion of said casing and coaxial with said rotor, and a rearward portion of said rotor comprising a cylindrical shaft and thrashing loops and pins thereon, a lower portion of said casing below said screen forming a trough into which fall kernels of grain passing through said screen, a screw conveyor in said trough for transporting said grain upwardly and rearwardly to a discharge point, and a radial fan at the rear of said rotor and coaxial therewith for drawing waste material rearwardly of said casing and discharging it through an opening in said casing.

2. A mobile corn harvester according to claim 1, comprising means for crushing stalks discharged through said elongate lower opening of said casing, said crushing means comprising ridged rollers with intermeshing ridges thereon between which said stalks pass and are crushed.

3. A mobile corn harvester according to claim 1, comprising an elevated discharge spout at the rear of said casing, and means for elevating grain from the rear end of said screw conveyor to said discharge spout for discharge therethrough.

4. A mobile corn harvester according to claim 3, a passage from said discharge spout to said radial fan for drawing air through grain passing through said discharge spout and thereby removing any light waste material.

5. A mobile corn harvester according to claim 3, comprising at the rear of said chassis a bagging platform in position to receive grain from said discharge spout, whereby grain from said discharge spout is discharged into bags on said platform.

6. A mobile corn harvester according to claim 1, in which said cylindrical screen is rotatable about the axis of rotation of said rotor.

* * * * *